Dec. 2, 1952 M. BECHIK Re. 23,590

HANDLE FOR MATTRESSES AND THE LIKE

Original Filed July 14, 1949

Inventor
Michael Bechik
By his Attorneys
Merchant & Merchant

Reissued Dec. 2, 1952

Re. 23,590

UNITED STATES PATENT OFFICE 23,590

HANDLE FOR MATTRESSES AND THE LIKE

Michael Bechik, St. Paul, Minn., assignor to Bechik Products, Inc., St. Paul, Minn., a corporation of Minnesota Original No. 2,564,947, dated August 21, 1951, Serial No. 104,673, July 14, 1949. Application for reissue September 6, 1951, Serial No. 245,279

6 Claims. (Cl. 5—345)

Matter enclosed in heavy brackets [ ] appears in the original patent but forms no part of this reissue specification; matter printed in italics indicates the additions made by reissue.

My invention relates to handles for mattresses and the like and has for its primary object the provision of such a device which has a minimum of parts, is rugged in construction, and durable in use.

A further and highly important object of my invention is the provision of a device which may be installed in the wall of a mattress or the like with great facility and ease.

A still further object of my invention is the provision of a handle for mattresses which may be inserted and removed from the wall of a mattress or the like only when the wall of the mattress is folded between the grommets, but which will maintain itself within the wall when the wall is stretched taut.

A still further object of my invention is the provision of an inexpensive mattress handle which, by virtue of its shape, will automatically maintain itself in abutting relationship to the mattress wall when not in use.

The above and still further objects of my invention will become apparent from the following detailed specification, appended claims and attached drawings.

Referring to the drawings, wherein like characters indicate like parts throughout the several views.

Figure 1:
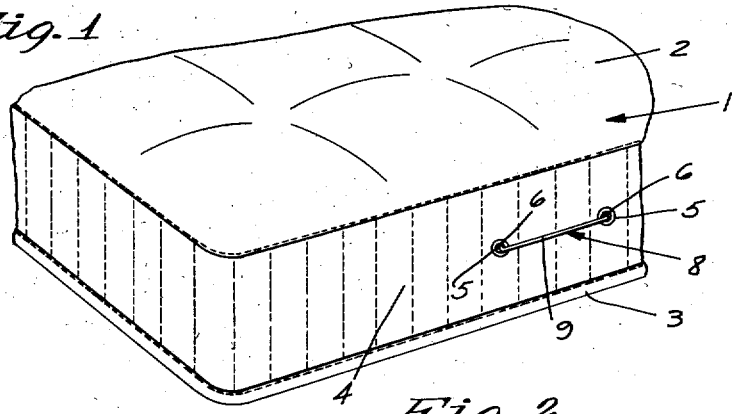
Fig. 1 is a fragmentary perspective view of the mattress showing my novel handle attached thereto.

Referring with greater particularity to the drawings, the numeral 1 indicates in its entirety a mattress comprising, amongst other things, top and bottom walls 2 and 3, respectively, and a side wall or boxing 4. The boxing 4 is shown as being provided with a pair of spaced, preferably metallic, grommets 5 which extend through and provide openings 6 in the side wall. It will be observed that at their inner ends, the grommets are provided with enlarged head-like washer elements 7.

Figure 3:
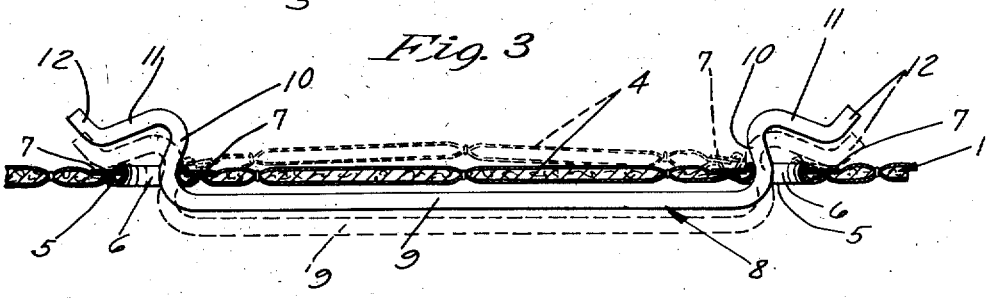
Fig. 3 is a still further enlarged fragmentary section taken substantially on the line 3—3 of Fig. 2.

Adapted to co-operate with the above described combination of elements, I provide a rigid handle element, identified in its entirety by the numeral 8, which may be formed from either round or flat wire or other suitable stock. As shown, the handle 8 includes a straight elongated hand-engaging bar portion 9 normally adapted to overlie the outer surface of the wall in close proximity between the grommets 5, as shown particularly in Fig. 3. At its opposite ends, bar 9 is provided with inturned portions 10, one each of which is adapted to project one each through the openings 6 in grommets 5. As shown particularly by reference to Fig. 3, the maximum distance between said inturned portions 10 corresponds to the minimum distance between the openings 6 and the grommets 5 when the wall 4 is in its normal taut condition, whereas the minimum distance between said inturned portions 10 is less than the minimum distance between the openings 6 and the grommets 5. This structural feature of my novel handle element causes the normally taut mattress side wall 4, connected through the grommets 5, to automatically cam the bar 9 from the dotted line position of Fig. 3 toward the side wall 4 or toward the full line position thereof. Thus when the handle is not in use, it is always held in close proximity to the wall 4 and said wall has a neat appearance, free from wrinkles.

The inturned portions 10 terminate in means for limiting outward movement of the bar 9 with respect to the wall 4. Preferably, this means is in the nature of angularly disposed stop portions 11 which project in a direction generally longitudinally of the bar 9. It will be noted that the portions 11 project in the direction of the washer elements 7 and are adapted to make engagement therewith upon outward movement of the bar 9 with respect to the wall 4, as shown by dotted lines in Fig. 3. This engagement of the stop portions 11 with the washer element 7 prevents engagement of the handle element 8 with the interior of the wall 4 and the consequent wear thereof. To further insure against any damage to the wall 4 by the stop element 11, the extreme outer ends thereof are inturned, as indicated at 12.

It should be noted that the above described handle element 8 is preferably installed in the mattress wall or boxing 4 before final assembly of the mattress 1. This assembly is accomplished as follows: One end of the handle element 8 is inserted by snaking same through the openings 6 in one of the grommets 5. This is accomplished when the hand element is held at substantially right angles to the wall element 4. The handle element 8 is inserted through the grommet 5 a distance approximating half of its length. The side wall 4 is then buckled or bent sufficiently to bring the opening 6 of the other grommet 5 into alignment with the other end 12 of the handle element 8. This other end is then inserted through the adjacent grommet 5 and the wall 4 straightened. In the final assembly of the mattress 1, the wall or boxing 4 is in a stretched or taut condition, wherein it is impossible to remove the handle element 8 without damage to the grommets 5 or the mattress wall or boxing 4. The mattress wall 4 has sufficient flexibility and resilience to permit the handle element 8 to be moved manually to the dotted line position illustrated in Fig. 3, so that the fingers of a user may be inserted between bar 9 and the mattress wall 4. The resilience in the mattress wall 4 tends to draw the grommets 5 in a direction away from one another and thereby cause the grommets 5 to cam the handle element 8 toward engagement with the mattress wall.

Figure 2:
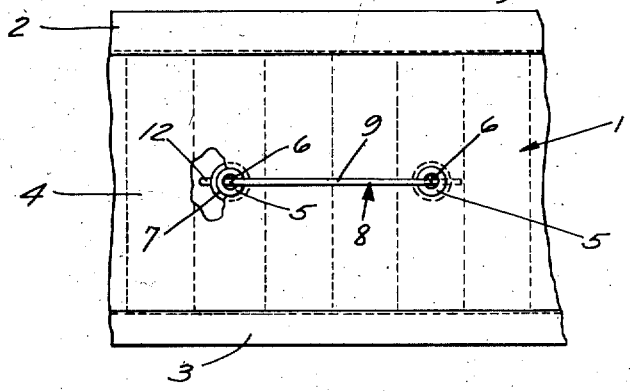
Fig. 2 is an enlarged fragmentary view in side elevation, some parts being broken away.
Figure 4:
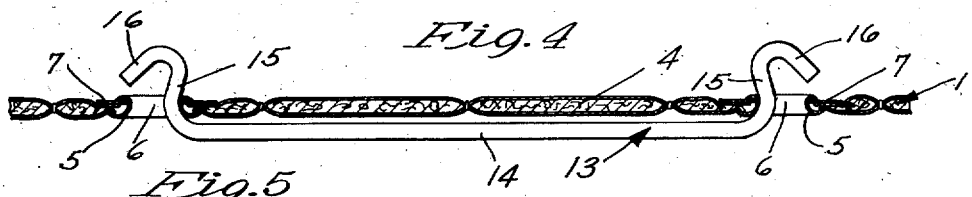
Fig. 4 is a view corresponding substantially to Fig. 3 but showing a slightly modified form of my invention.

In the modified form illustrated in Fig. 4, I provide a handle element 13 comprising a rigid bar 14 overlying the exterior of the mattress wall 4 between the spaced grommets 5 therein. At its opposite ends, the bar 14 is provided with converging portions 15 in the same manner as the handle member 8. The converging portions 15 terminate in angularly outwardly extending ends 16 that are adapted to engage the washers 7 immediately radially outwardly of the grommets 5. It will be appreciated that this form of my invention uses less material than the preferred form illustrated in Figs. 1 to 3, inclusive, and is slightly less expensive to manufacture.

Figure 5:
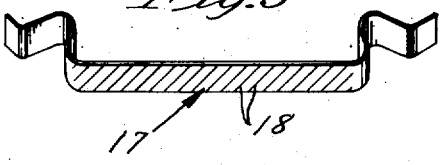
Fig. 5 is a view in perspective of a further modified form of the handle.

In the modified form of the invention illustrated in Fig. 5, I provide a handle element 17 preferably made from flat wire or bar stock and provided with ornamental configuration 18. In all other respects the handle element 17 is identical to the handle element 8 of Figs. 1 to 3, inclusive.

While I have disclosed a preferred embodiment and two modifications of my improved mattress handle, it will be understood that the same is capable of further modification without departure from the scope and spirit of the invention as defined in the claim.

What I claim is:

1. A handle adapted to be utilized in conjunction with a mattress wall or the like having therein spaced grommets providing openings extending through said wall, said handle comprising a rigid bar adapted to overlie the outer surface of said wall between said grommets, said bar being provided with converging inturned portions which are adapted to project one each through each of said grommets, the distance between said inturned portions immediately adjacent said bar being substantially equal to the distance between said grommets.

2. A handle construction for mattress walls and the like comprising a pair of spaced grommets providing openings extending through said wall, a rigid hand-engaging bar normally overlying the outer surface of said wall, said bar having inturned portions which converge in the direction of the interior of the mattress to points which are spaced apart less than the distance between the openings in said grommets, the distance between said inturned portions immediately adjacent said hand-engaging bar corresponding approximately to the distance between the openings in said grommets.

3. The structure defined in claim 1 in which the opposite ends of said handle are formed to project longitudinally thereof in opposite directions and in the same horizontal plane as said bar, engagement of said end portions with the interior of said mattress wall limiting outward movements of said bar.

4. A handle adapted to be utilized in conjunction with a mattress wall or the like having therein spaced grommets providing openings through said wall, said grommets including enlarged washer elements on the interior of said wall, said handle comprising a rigid bar adapted to overlie the outer surface of said wall between said grommets, said bar being provided with inturned portions which project one each through each of said grommets to points which are spaced apart less than the distance between the openings in said grommets, the distance between said inturned portions immediately adjacent said bar corresponding approximately to the distance between the openings in said grommets, said inturned portions terminating in angular ends which extend in opposite directions in the same horizontal plane as said bar, said angular end portions being adapted to engage said washer elements upon outward movement of said bar with respect to said wall and limiting said outward movements.

*5. A handle adapted to be utilized in conjunction with a taut mattress wall or the like having therein spaced grommets providing openings through said wall, said handle comprising a rigid bar adapted to overlie the outer surface of said wall between said grommets, said bar being provided with inturned portions which extend through said grommets at oblique angles to said bar, the distance between the ends of said inturned portions adjacent said bar permitting reception thereof in said grommets without placing tension upon the mattress wall, the distance between the free ends of said inturned portions being such as to place tension upon said mattress wall through said grommets when said bar is moved laterally outwardly with respect to said wall.*

*6. A handle adapted to be utilized in conjunction with a taut mattress wall or the like having therein spaced grommets providing openings through said wall, said handle comprising a rigid bar adapted to overlie the outer surface of said wall between said grommets, said bar being provided with inturned portions which extend through said grommets at oblique angles to said bar and terminate at their free ends in stop elements which extend in a direction generally parallel to the bar, the distance between the ends of said inturned portions adjacent said bar permitting reception thereof in said grommets without placing tension upon the mattress wall, frictional engagement of the inturned portions upon said grommets when said bar is moved outwardly from said wall tending to return said bar toward engagement with said wall through camming action of said inturned portions upon said grommets.*

MICHAEL BECHIK.

REFERENCES CITED

The following references are of record in the file of this patent or the original patent:

UNITED STATES PATENTS

| Number | Name | Date |
|---|---|---|
| 828,519 | Seng | Aug. 14, 1906 |
| 2,322,995 | Allen | June 29, 1943 |